United States Patent
Liu et al.

(10) Patent No.: US 12,267,176 B2
(45) Date of Patent: Apr. 1, 2025

(54) SIDELINK INFORMATION TRANSMISSION METHOD, TERMINAL, AND CONTROL NODE

(71) Applicant: VIVO MOBILE COMMUNICATION CO., LTD., Guangdong (CN)

(72) Inventors: Siqi Liu, Guangdong (CN); Zichao Ji, Guangdong (CN); Na Li, Guangdong (CN); Shixiao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 475 days.

(21) Appl. No.: 17/578,746

(22) Filed: Jan. 19, 2022

(65) Prior Publication Data
US 2022/0140955 A1     May 5, 2022

Related U.S. Application Data

(63) Continuation of application No. PCT/CN2020/102330, filed on Jul. 16, 2020.

(30) Foreign Application Priority Data

Jul. 24, 2019   (CN) .......................... 201910673801.7

(51) Int. Cl.
*H04L 1/18*      (2023.01)
*H04L 1/1829*    (2023.01)
*H04W 72/04*     (2023.01)
*H04W 72/20*     (2023.01)

(52) U.S. Cl.
CPC ........... *H04L 1/1861* (2013.01); *H04W 72/20* (2023.01)

(58) Field of Classification Search
CPC ... H04W 28/04; H04W 72/04; H04W 72/042; H04W 88/08; H04W 72/20; H04W 72/0406; H04L 5/0007; H04L 1/1861
USPC .......................................................... 370/329
See application file for complete search history.

(56) References Cited

U.S. PATENT DOCUMENTS

| | | | |
|---|---|---|---|
| 11,765,690 B2* | 9/2023 | Huang | H04B 7/0456 370/329 |
| 2017/0347352 A1 | 11/2017 | Luo | |
| 2021/0028910 A1* | 1/2021 | Cheng | H04L 1/1854 |
| 2021/0076236 A1 | 3/2021 | Kimura | |
| 2021/0321380 A1 | 10/2021 | Zhao | |

(Continued)

FOREIGN PATENT DOCUMENTS

| | | | | |
|---|---|---|---|---|
| CN | 109792326 A * | 5/2019 | ............... | H04L 1/18 |
| CN | 109792369 A * | 5/2019 | ............ | H04W 76/23 |
| CN | 109792594 A * | 5/2019 | .......... | H04W 72/044 |

(Continued)

OTHER PUBLICATIONS

3GPP TSG RAN WG1 #96, Athens, Greece, Feb. 25-Mar. 1, 2019, R1-1901944, Agenda Item: 7.2.4.1.2, Source: Fujitsu , Title: Discussion on HARQ-ACK feedback for NR-V2X. (Year: 2019).*

(Continued)

Primary Examiner — Peter G Solinsky
Assistant Examiner — Sanjay K Dewan
(74) Attorney, Agent, or Firm — Price Heneveld LLP

(57) ABSTRACT

Embodiments of this disclosure provide a sidelink information transmission method, a terminal, and a control node. The method includes: mapping sidelink information to target notification information; and transmitting the target notification information on a target resource.

20 Claims, 4 Drawing Sheets

---

Map sidelink information to target notification information — 201

Transmit the target notification information on a target resource — 202

(56) References Cited

U.S. PATENT DOCUMENTS

| | | | |
|---|---|---|---|
| 2022/0077962 A1 | 3/2022 | Zhao | |
| 2023/0276461 A1* | 8/2023 | Lee | H04W 72/02 |
| | | | 370/329 |

FOREIGN PATENT DOCUMENTS

| | | | | |
|---|---|---|---|---|
| EP | 3905569 A1 | 3/2021 | | |
| EP | 3 905 569 569 A1 * | 11/2021 | | H04L 1/18 |
| EP | 4 030 664 B1 * | 11/2023 | | H04L 1/1861 |
| JP | WO 2019124067 A1 * | 6/2019 | | H04W 24/08 |
| WO | 2019124067 A1 | 6/2019 | | |
| WO | WO 2021013036 A1 * | 1/2021 | | H04L 1/1861 |

OTHER PUBLICATIONS

3GPP TSG RAN WG2 Meeting #106, Reno, USA, May 13-17, 2019, R2-1906733, resubmission of R2-1904159, Agenda Item: 11.4.2, Source: Lenovo, Motorola Mobility, Title: SL HARQ operation. (Year: 2019).*

3GPP TSG RAN WG1 #97, Reno, USA, May 13-17, 2019, R1-1906935, Agenda item: 7.2.4.2.1, Source: Samsung, Title: On Resource Allocation for NR V2X Mode 1. (Year: 2019).*

3GPP TSG RAN WG1 Meeting #95, Spokane, USA, Nov. 12-16, 2018, R1-1813554, Agenda Item: 7.2.4.1.5, Source: Huawei, HiSilicon, Title: Design and contents of PSSCH and PSFCH. (Year: 2018).*

Huawei, "Design and contents of PSCCH and PSFCH", 3GPP TSG RAN WG1 Meeting #95, R1-1813554, Spokane, USA, Nov. 12-16, 2018.

Lenovo, "SL HARQ operation", 3GPP TSG RAN WG2 Meeting #106, R2-1906733, Reno, USA, May 13-17, 2019.

Fujitus, "Discussion on HARQ-ACK feedback for NR-V2X", 3GPP TSG RAN WG1 #96, R1-1901944, Athens, Greece, Feb. 25-Mar. 1, 2019.

Samsung, "On Resource Allocation for NR V2X Mode 1", R1-1906935, 3GPP TSG RAN WG1 #97, May 13-May 17, 2019, Reno, USA.

* cited by examiner

SIDELINK INFORMATION TRANSMISSION METHOD, TERMINAL, AND CONTROL NODE

CROSS-REFERENCE TO RELATED APPLICATIONS

This application is a continuation application of International Application No. PCT/CN2020/102330 filed on Jul. 16, 2020, which claims priority to Chinese Patent Application No. 201910673801.7 filed in China on Jul. 24, 2019, both of which are incorporated herein by reference in their entirety.

TECHNICAL FIELD

This disclosure relates to the field of communications technologies, and in particular, to a sidelink information transmission method, a terminal, and a control node.

BACKGROUND

In a new radio (NR) system, for transmission of a downlink data packet, a terminal may feed back, according to reception and decoding statuses of the terminal, hybrid automatic repeat request acknowledgement (HARQ-ACK) information (that is, negative acknowledgement character NACK or acknowledgement character ACK) on a physical uplink control channel (PUCCH) or physical uplink shared channel (PUCCH), to inform a control node whether the transmission of the downlink data packet is successful, thereby helping the control node to decide whether retransmission is required.

On a sidelink (sidelink), a terminal transmits sidelink control information (SCI) over a physical sidelink control channel (PSCCH), and schedules transmission of a physical sidelink shared channel (PSSCH) to transmit sidelink data. In order to improve reliability and resource utilization of data transmission on the sidelink, a HARQ feedback mechanism is also introduced in NR sidelink technology: After receiving sidelink data, a sidelink receiving terminal may feed back sidelink HARQ-ACK information to indicate a transmission success or failure on a sidelink, where a HARQ acknowledgement is transmitted over a physical sidelink feedback channel (PSFCH).

However, unlike the HARQ feedback mechanism for downlink data packet transmission over an NR Uu interface, sidelink transmission may be carried out not between a control node and a terminal, but on a sidelink between terminals. Therefore, the control node cannot directly know whether a transmission of a sidelink data packet is successful, the terminal needs to transmit sidelink HARQ-ACK information to the control node, so that the control node can further determine whether the transmission on the sidelink is successful, and finally determine whether then the transmitting terminal needs to be scheduled to perform retransmission on the sidelink.

There is still no discussion on specific steps and details of how a sidelink terminal transmits sidelink information out.

SUMMARY

Embodiments of this disclosure provide a sidelink information transmission method, a terminal, and a control node.

According to a first aspect, some embodiments of this disclosure provide a sidelink information transmission method, applied to a terminal and including:

mapping sidelink information to target notification information; and transmitting the target notification information on a target resource.

According to a second aspect, some embodiments of this disclosure further provide a sidelink information transmission method, applied to a control node and including:

receiving, on a target resource, target notification information transmitted by a terminal, where the target notification information is target notification information mapped from sidelink information.

According to a third aspect, some embodiments of this disclosure further provide a terminal, including:

a mapping module, configured to map sidelink information to target notification information; and a first transmission module, configured to transmit the target notification information on a target resource.

According to a fourth aspect, some embodiments of this disclosure further provide a control node, including:

a second transmission module, configured to receive, on a target resource, target notification information transmitted by a terminal, where the target notification information is target notification information mapped from sidelink information.

According to a fifth aspect, some embodiments of this disclosure further provide a terminal, including a memory, a processor, and a program stored in the memory and capable of running on the processor, where when the program is executed by the processor, the steps of the foregoing sidelink information transmission method are implemented.

According to a sixth aspect, some embodiments of this disclosure further provide a control node, including a memory, a processor, and a program stored in the memory and capable of running on the processor, where when the program is executed by the processor, the steps of the foregoing sidelink information transmission method are implemented.

According to a seventh aspect, some embodiments of this disclosure further provide a readable storage medium, where the readable storage medium stores a program, and when the program is executed by a processor, the steps of the foregoing sidelink information transmission method are implemented.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. In addition, in the specification and claims, the use of "and/or" represents presence of at least one of the connected objects, for example, "A and/or B" indicates that the following three cases: only A, only B, or both A and B.

In some embodiments of this disclosure, the word such as "exemplary" or "for example" is used to represent giving an example, an instance, or an illustration. Any embodiment or design scheme described as "an example" or "for example" in some embodiments of this disclosure should not be construed as being more preferred or advantageous than other embodiments or design schemes. Specifically, the terms such as "an example" or "for example" are intended to present related concepts in a specific manner.

The following describes embodiments of this disclosure with reference to the accompanying drawings. A sidelink information transmission method, a terminal, and a control node provided in some embodiments of this disclosure may be applied to a wireless communications system. The wireless communications system may be a 5G system, or an evolved long term evolution (eLTE) system, or a later evolved communications system.

Figure 1A:
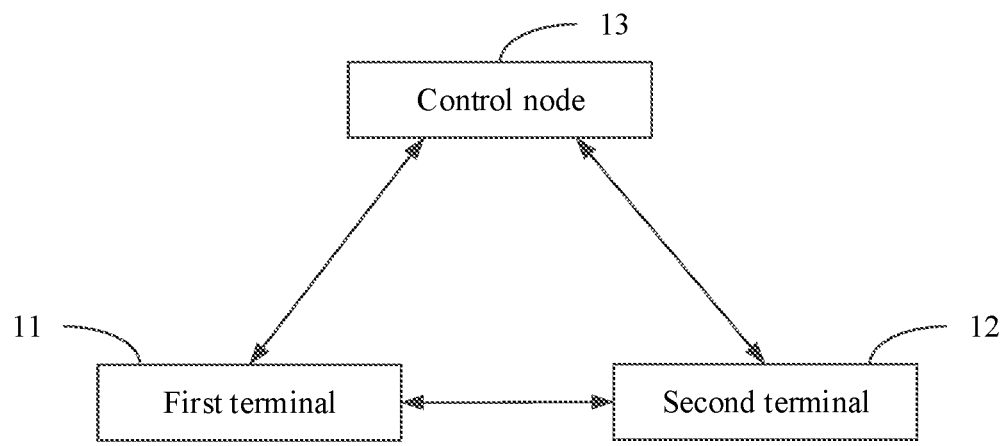
FIG. 1a is a structural diagram of a network system to which some embodiments of this disclosure may be applied.
Figure 1B:
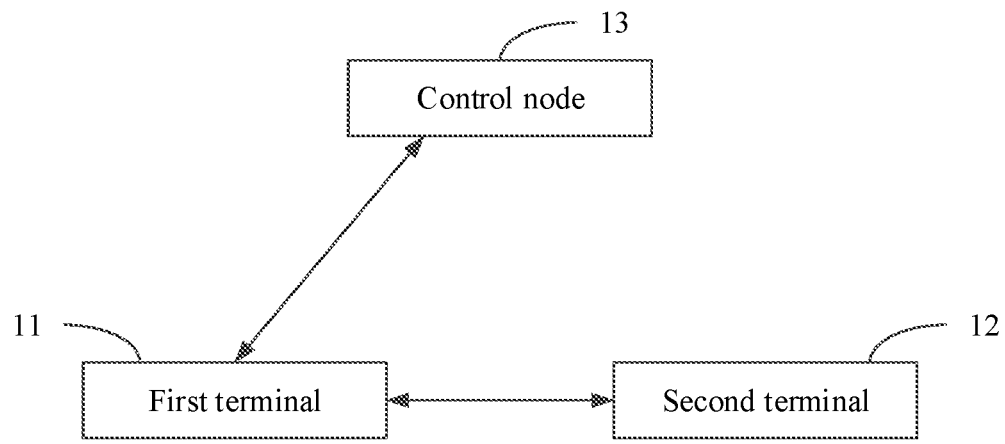
FIG. 1b is another structural diagram of a network system to which some embodiments of this disclosure may be applied.

Referring to FIG. 1a and FIG. 1b, FIG. 1a and FIG. 1b are structural diagrams of a network system to which some embodiment of this disclosure may be applied. As shown in FIG. 1a and FIG. 1b, the network system includes a first terminal 11, a second terminal 12, and a control node 13. The first terminal 11 and the second terminal 12 may be user terminals or other terminal-side devices such as mobile phones, tablet personal computers, laptop computers, personal digital assistant (PDA), mobile Internet devices (MID), or wearable devices. It should be noted that specific types of the first terminal 11 and the second terminal 12 are not limited in some embodiments of this disclosure. The control node 13 may be a network device or a terminal. The network device may be a 5G base station, a base station of a later version, or a base station in other communications systems, or may be referred to as a NodeB, an evolved NodeB, a transmission reception point (TRP), an access point (AP), or other terms in the field. Provided that a same technical effect is achieved, the network device is not limited to a specific technical term. In addition, the network device may be a master node (MN) or a secondary node (SN). It should be noted that, in some embodiments of this disclosure, the 5G base station is used as only an example, but the network device is not limited to any specific type.

Figure 2:
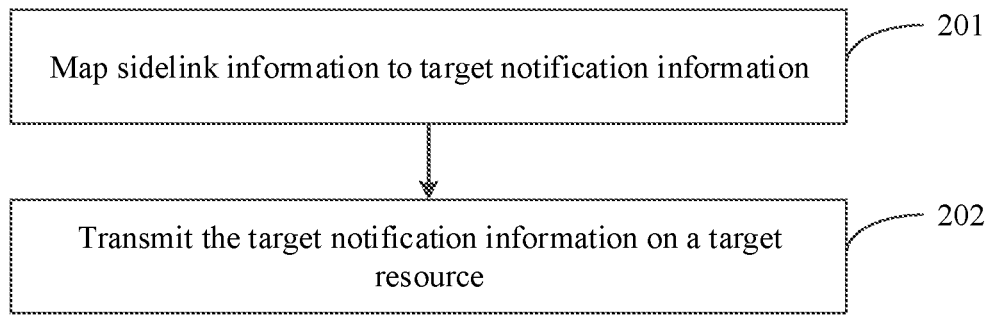
FIG. 2 is a first flowchart of a sidelink information transmission method according to some embodiments of this disclosure.

FIG. 2 is a flowchart of a sidelink information transmission method according to some embodiments of this disclosure. The method is applied to a terminal. As shown in FIG. 2, the method includes the following steps:

step 201: map sidelink information to target notification information; and step 202: transmit the target notification information on a target resource.

In some embodiments of this disclosure, the terminal is a terminal other than the control node in a sidelink transmission system. For example, the terminal may be a transmitting terminal that transmits a sidelink transmission, or a receiving terminal that receives a sidelink transmission, or an intermediate terminal, where the intermediate terminal is an intermediate transmission node through which the transmitting terminal or the receiving terminal transmits data to the control node, and the intermediate transmission node includes no transmitting terminal. In the following embodiments, the terminal is taken as an example of a transmitting terminal of a sidelink transmission and an example of a receiving terminal of a sidelink transmission for description. In this case, a receiver of the target notification message may be the control node, or the intermediate terminal. In the following embodiments, the control node is taken as an example of the receiver of the target notification information for description.

Optionally, when the terminal is a transmitting terminal, the transmitting terminal may receive the sidelink information through a PSFCH or PSSCH. When the terminal is a receiving terminal, the sidelink information may be determined based on a receiving status of the sidelink transmission. For ease of understanding, hereinafter, reception of the sidelink information by the transmitting terminal and determination of the sidelink information by the receiving terminal are collectively referred to as obtaining of the sidelink information by the terminal.

In this embodiment, after obtaining the sidelink information, the terminal may map the sidelink information to target notification information, and transmit the target notification information to a control node by using a target resource. The sidelink information includes at least one of sidelink HARQ-ACK information corresponding to one or more sidelink transmissions, a sidelink scheduling request (SR), channel state information (CSI), and the like. The control node may support a sidelink link and/or a Uu link, where the terminal maps the sidelink information to the target notification information. If the target notification information is transmitted to the control node through the sidelink link, the control node may be referred to as a sidelink control node; and if the target notification information is transmitted to a control node through the Uu link, the control node may be referred to as a Uu control node. When the control node is the Uu control node, the target resource may be a PUCCH or PUSCH. When the control node is the sidelink control node, the target resource may be a PSFCH or PSSCH.

In some embodiments of this disclosure, mapping the sidelink information to the target notification information can help a control node to understand the sidelink information, implementing transmission of the sidelink information.

It should be understood that a mode of mapping the sidelink information to the target notification information may be set based on an actual requirement, which is described in detail below.

In an optional embodiment, a mode of mapping the sidelink information to the target notification information includes at least one of the following:

mapping mode 1: mapping each bit of N1 first bits to one second bit;

mapping mode 2: mapping N2 first bits to M1 second bits;

mapping mode 3: mapping N3 bits to W second bits according to a preset mode; and mapping mode 4: determining a first bit sequence associated with a bit sequence formed by N4 first bits as indication information of second bits corresponding to the N4 first bits; where the first bits are bits in the sidelink information, the second bits are bits in the target notification information, N1, N2, and W are all positive integers, N3 and N4 are integers greater than 1, M1 is an integer greater than N2, and N3 is greater than W.

It should be noted that when at least two mapping modes are used in the mapping the sidelink information to the target notification information, different mapping modes may correspond to different parts of the sidelink information. For example, first N bits and last M bits of the sidelink information correspond to different mapping modes; or different information types may correspond to different mapping modes, for example, CSI and HARQ-ACK correspond to different mapping modes. Details are not further limited herein.

Corresponding to the mapping mode 1, it can be understood that bits in the sidelink information and the target notification information are in a one-to-one mapping relationship. A state indicated by the first bit is the same as a state indicated by the corresponding second bit. For example, when the first bit is a bit of HARQ-ACK information, a state indicated by the first bit is the same as a state indicated by the corresponding second bit. For example, for HARQ-ACK bits, if the first bit in the sidelink information indicates ACK, the second bit in the corresponding target notification information indicates ACK; and if the first bit in the sidelink information indicates NACK, the second bit in the corresponding target notification information indicates NACK.

Corresponding to the mapping mode 2, it can be understood that the sidelink information is expanded to obtain target notification information. For example, the expansion may be achieved by repeating and/or adding redundant bits, thereby improving reliability. In this embodiment, the mapping N2 first bits to M1 second bits includes any one of the following:

Scheme 1: after mapping the N2 first bits to M2 second bits, inserting a second bit sequence of M3 bits in the M2 second bits to obtain the M1 second bits;

Scheme 2: after inserting a third bit sequence of M4 bits in the N2 first bits, mapping combined bits of the N2 first bits and the third bit sequence to the M1 second bits;

Scheme 3: after repeating each bit of the N2 first bits at least once, performing concatenation to obtain the M1 second bits;

Scheme 4: after repeating each bit of the N2 first bits at least once, performing concatenation and inserting at least one fourth bit sequence to obtain the M1 second bits;

Scheme 5: concatenating at least two target objects to obtain the M1 second bits; and Scheme 6: after concatenating at least two target objects, inserting at least one fourth bit sequence to obtain the M1 second bits; where the target objects are the N2 first bits, and M2, M3, and M4 are all positive integers.

In this embodiment, the second bit sequence may be any one of the following:

M3 fixed states;
M3 redundant bits; and
M3 parity bits.

When the second bit sequence is redundant bits, reliability of sidelink information transmission can be improved.

In Scheme 1, the second bit sequence may be configured by a network side, pre-configured by the network side, prescribed by a protocol, negotiated between terminals, indicated by another terminal, or the like, which is not further limited herein. Optionally, one or more second bit sequences are inserted into the M2 second bits. When the number of second bit sequences is 1, the second bit sequence may be located before or after the M2 second bits, or may be located between any two second bits of the M2 second bits. For example, the second bit sequence is 11, the M2 second bits are 0000, and the M1 second bits formed by inserting a second bit sequence into the M2 second bits may be 110000, 000011, 001100, or the like. Further, the M1 second bits formed by inserting two second bit sequences into the M2 second bits may be 11000011, 00001111, 01100110, 00110011, or the like. Certainly, in other embodiments, the second bit sequence may be one or more bits, which is not further limited herein.

In Scheme 2 and Scheme 6, the third bit sequence and the fourth bit sequence may be consistent with the second bit sequence in form. For details, reference may be made to the description of the second bit sequence, and description is not repeated herein.

In Scheme 3 to Scheme 6, at least two repeated second bits are obtained by repeating the first bits. In Scheme 3 and Scheme 4, repetition is performed separately on each first bit. For example, in Scheme 3, when the N2 first bits are 1100 and a value of M1 is 8, the M1 second bits are 11110000. In Scheme 4, when the N2 first bits are 1100, a value of M1 is 10, and the fourth bit sequence is "X", the M1 second bits may be 11110000XX, X11110000X, X1111X0000, X1X1110000, or the like. In Scheme 5 and Scheme 6, repetition is performed on the N2 first bits as a whole. For example, in Scheme 6, when the N2 first bits are 1100 and M1 is 10, the M1 second bits are 11001100XX, where M1 second bits include two fourth bit sequences "X", and the "X" may be a fixed value. Certainly, in other embodiments, the fourth bit sequence may also be set in other positions. For example, the M1 second bits may also be X11001100X, 1100X1100X, or X1X1001100.

It should be understood that for Scheme 4 and Scheme 6, insertion before or after mapping may be further performed on the bits after repetition, or certainly, no further mapping may be performed.

Further, in Scheme 1, the mapping N2 first bits to M2 second bits includes:

mapping each bit of the N2 first bits to one second bit; and
mapping N3 bits of the N2 first bits to W second bits according to a preset mode, where N3 and W are positive integers, and N3 is greater than W.

In this embodiment, the N2 first bits may include one or more mapping units, the number of bits in each mapping unit may be the same or different, and a value of N3 is a smallest value of the numbers of bits in the mapping units.

Corresponding to the mapping mode 3, it can be understood that a third bit sequence is first inserted in the N2 first bits, and then mapping is performed. In an optional embodiment, the mapping combined bits of the N2 first bits and the third bit sequence to the M1 second bits includes:

mapping each bit of the combined bits to one second bit; and
mapping N3 bits of the combined bits to W second bits according to a preset mode, where N3 and W are positive integers, and N3 is greater than W.

In this embodiment, the N2 first bits may include one or more mapping units, the number of bits in each mapping unit may be the same or different, and a value of N3 is a smallest value of the numbers of bits in the mapping units.

Further, the preset mode can be understood as a compression mode, and the specific compression calculation mode may be set according to an actual requirement. The following takes mapping of four first bits to one second bit as an example for description. For example, in some embodiments of this disclosure, the preset mode includes at least one of the following compression modes:

in a case that at least two bits include at least one bit for indicating a first value, one second bit corresponding to the at least two bits indicates the first value, and the at least two bits are bits of the N3 bits; and a specific representation of the first value may be determined based on an information type of a corresponding bit. For example, for the sidelink HARQ-ACK information, the first value is a negative acknowledgement character (for example, 0 may be used to represent the negative acknowledgement character, and 1 is used to represent an acknowledgement character; alternatively, 1 may be used to represent the negative acknowledgement character, and 0 is used to represent the acknowledgement character);

in a case that the at least two bits all indicate a second value, one second bit corresponding to the at least two bits indicates the second value; and a specific representation of the second value may be determined based on an information type of a corresponding bit. For example, for the sidelink HARQ-ACK information, the second value is an acknowledgement character. For example, 1 may be used to indicate the acknowledgement character, and in this case, if all of the four first bits obtained by the terminal indicate the acknowledgement character, the second bit mapped from the four first bits indicates the acknowledgement character;

in a case that the at least two bits include at least one bit for indicating a second value, one second bit corresponding to the at least two bits indicates the second value. For example, for the sidelink HARQ-ACK information, the second value is an acknowledgement character. For example, 1 may be used to indicate the acknowledgement character, and in this case, if four first bits obtained by the terminal is 0001, the second bit mapped from the four first bits indicates the acknowledgement character;

in a case that the at least two bits all indicate a first value, one second bit corresponding to the at least two bits indicates the first value. For example, for the sidelink HARQ-ACK information, the first value is a negative acknowledgement character. For example, 0 may be used to indicate the negative acknowledgement character, and in this case, if four first bits obtained by the terminal is 0000, the second bit mapped from the four first bits indicates the negative acknowledgement character;

an AND operation is performed on the at least two bits to obtain indication information of the second bit corresponding to the at least two bits;

a modulo P operation is performed on a sum of the N3 bits to obtain indication information of the W second bits, where P is an integer greater than 1;

an OR operation is performed on the at least two bits to obtain indication information of one second bit corresponding to the at least two bits;

an XOR operation is performed on the at least two bits to obtain indication information of one second bit corresponding to the at least two bits; and indication information of one second bit corresponding to the at least two first bits is determined based on an interval range to which values corresponding to the at least two bits belong. The interval range may include at least two interval ranges, and no intersection between the interval ranges exists. The value corresponding to the at least two bits may be a sum value corresponding to the at least two bits, or may be a decimal value corresponding to the at least two bits as a binary code. For example, the interval range includes a first range (less than 5) and a second range (greater than or equal to 5). In this case, if the value corresponding to the at least two bits is 4, it is determined that one second bit corresponding to the at least two bits may be a first value, and the first value is 0; and if the value corresponding to at least two bits is 6, it is determined that one second bit corresponding to the at least two bits may be a second value, and the second value may be 1. Certainly, in other embodiments, a value correspondingly indicated by the first range may be a second value and a value correspondingly indicated by the second range may be a first value, which is not further limited herein.

It should be understood that the foregoing AND operation may include two operation types: AND and Bitwise AND. Using the AND operation as an example, if the AND operation is performed on 1100, one second bit is obtained, and the second bit is 0.

It should be noted that the N3 bits may include one or more mapping units, the number of bits in each of the mapping units may be the same or different, and the value of the N3 is a smallest value of the numbers of bits in the mapping units. When a plurality of mapping units are included, it is required to concatenate mapped results of each of the mapping units. For example, it is assumed that there is 10-bit sidelink information, if a mapping unit is of 10 bits, the 10-bit sidelink information is mapped to one second bit according to the preset mode, and it is not required to perform concatenation; and if the mapping unit is of 5 bits, each piece of 5-bit sidelink information is mapped to one second bit according to the preset mode, and finally two second bits are concatenated and obtained.

Further, a value of P may be set according to an actual requirement, which is not further limited herein. When the value of P is 2, a corresponding W is 1; and when the value of P is 3 or 4, a corresponding W is 2.

It should be noted that for the same sidelink information, one or more of the preset modes may be used for mapping. When a plurality of modes are used for mapping, different parts or different types of information may be mapped in different modes, which is not further limited herein.

Further, in this embodiment, the method further includes:

receiving scheduling signaling transmitted by a control node, where the scheduling signaling is used to indicate a sidelink resource; and performing sidelink transmission on the sidelink resource.

It should be noted that the control node may determine whether the sidelink resource indicated in the scheduling signaling is used for initial transmission or retransmission.

Optionally, the scheduling signaling may further be used to indicate whether the sidelink resource is used for retransmission or initial transmission.

In this embodiment, regardless of whether the scheduling signaling distinguishes retransmissions, the terminal can perform a retransmission operation based on the sidelink information or the target notification information. In addition, the sidelink transmission for which the scheduling signaling indicates a retransmission may also be retransmitted.

The sidelink resource may include resources for one or more sidelink transmissions. For example, when the sidelink resource includes resources for four sidelink transmissions, four resources may be indicated by one piece of DCI, or four resources may be indicated by four pieces of DCI, where each piece of DCI indicates one resource. In this embodiment, when the sidelink resource includes four resources, a retransmission may be performed according to an indication from a network device for retransmitting the sidelink transmission; or a retransmission may be performed based on the sidelink HARQ-ACK information in the sidelink information; or a retransmission may be performed according to an indicator status of a specific bit in the target notification information, where the specific bit refers to a bit in the target notification information mapped from the sidelink HARQ-ACK information.

For example, in an optional embodiment, in a case that retransmission is performed according to an indicator status of a specific bit in the target notification information, a retransmission may be performed for the sidelink transmission corresponding to a specific bit that has an indicator status of NACK. If a specific bit corresponds to sidelink HARQ-ACK information of four sidelink transmissions, that is, the specific bit corresponds to a 4-bit sidelink HARQ-ACK (for example, 0011) and the specific bit is a result of an AND operation on the 4-bit sidelink HARQ-ACK, the obtained specific bit is 0. In this case, the terminal may perform retransmission of the two sidelink transmissions corresponding to the non-acknowledgement characters indicated in the 4-bit sidelink HARQ-ACK, or may perform retransmission of the four sidelink transmissions corresponding to the 4-bit sidelink HARQ-ACK.

In another optional embodiment, when a retransmission is performed based on the sidelink HARQ-ACK information in the sidelink information, only a sidelink transmission that actually has failed to be transmitted may be retransmitted. If there are actually three sidelink transmissions that have failed to be transmitted, and each sidelink transmission corresponds to one resource, in this case, retransmission may be performed on the resources corresponding to the three sidelink transmissions that have failed to be transmitted, and on another resource, no transmission or an initial transmission of other TBs is performed.

The scheduling signaling indicates, in resource allocation, whether an allocated resource can be used for retransmission. In this case, in another optional embodiment, the terminal may perform retransmission according to an indication in the scheduling signaling. For example, if the scheduling signaling indicates to retransmit TB1, the terminal retransmits the TB1, regardless of whether the status indicated by the bit corresponding to TB1 in the target notification information and the sidelink information is NACK or ACK.

In this embodiment, the performing sidelink transmission on the sidelink resource includes one of the following:

performing sidelink retransmission of sidelink data corresponding to first sidelink information, where the first sidelink information is sidelink information for which first bits indicate a negative acknowledgement character;

performing sidelink retransmission of sidelink data corresponding to second sidelink information, where the second sidelink information is sidelink information corresponding to a negative acknowledgement character indicated by a second bit; and in a case that the control node indicates to retransmit sidelink data, performing sidelink retransmission of the sidelink data that is indicated to be retransmitted.

Optionally, in a case that the target resource is provided in plurality, the transmitting the target notification information on a target resource includes: transmitting the target notification information on the plurality of target resources. In this embodiment, the transmitting the target notification information on the plurality of target resources can be understood as repeatedly transmitting the target notification information, which can improve reliability of transmitting the target notification information, and avoid a situation in which the terminal transmits the target notification information to a control node only once when the terminal is at a cell edge or suddenly suffers from channel degradation may not guarantee that the target notification information is surly detected and correctly decoded by the control node. As a result, a sidelink process is suspended, and a traffic latency requirement cannot be satisfied.

To help better understand this disclosure, the following describes in detail an implementation process of this disclosure by using an example in which a sidelink terminal (hereinafter referred to as a terminal) transmits sidelink information (using sidelink HARQ-ACK information as an example for description) to a control node.

The terminal may include a transmitting terminal (a terminal transmitting a sidelink transmission) and a receiving terminal (a terminal receiving the sidelink transmission). The control node may support a sidelink link and/or a Uu link, where the terminal maps the sidelink information to the target notification information. If the target notification information is transmitted to the control node through the sidelink link, the control node may be referred to as a sidelink control node, and the target notification information can be understood as sidelink HARQ-ACK information; and if the target notification information is transmitted to a control node through the Uu link, the control node may be referred to as a Uu control node, and the target notification information can be understood as Uu HARQ-ACK information. Certainly, the sidelink HARQ-ACK information and the Uu HARQ-ACK information are only used for distinguishing HARQ-ACK information that is transmitted by the terminal through different links, and not for limiting transmission content. It is also possible that the sidelink HARQ-ACK information and the Uu HARQ-ACK information are collectively referred to as HARQ-ACK information.

It should be understood that cases in which the terminal obtains the sidelink information include:

Case 1: The transmitting terminal transmits a sidelink transmission, the receiving terminal receives the sidelink transmission and determines corresponding sidelink HARQ-ACK information; and the receiving terminal feeds back the sidelink HARQ-ACK information to the transmitting terminal through a PSFCH or PSSCH, and the transmitting terminal receives sidelink HARQ-ACK information corresponding to at least one sidelink transmission or sidelink HARQ-ACK information from at least one receiving terminal, where the information is sidelink information. In this case, the transmitting terminal reports to the control node.

Case 2: The receiving terminal receives at least one sidelink transmission and determines corresponding sidelink HARQ-ACK information, where the information is sidelink information, and in this case, it is the RX UE that reports to the control node.

The transmitting terminal or the receiving terminal maps the sidelink information to the target notification information. When the control node is a Uu control node, the mapped information is reported to a base station through the target resource (uplink resource); and when the control node is a sidelink control node, the mapped information is reported to the sidelink control node through the target resource (sidelink resource).

In one embodiment, the control node being a Uu control node is used as an example for description, and the steps of mapping the sidelink information to the target notification information and transmitting by a terminal specifically include:

Step 1: After obtaining the sidelink HARQ-ACK information, the terminal maps the K-bit sidelink HARQ-ACK information obtained by the terminal to Uu HARQ-ACK information, according to at least one of the following methods.

Method 1 (one-to-one correspondence): Each sidelink HARQ-ACK bit corresponds to one Uu HARQ-ACK bit.

Note that this does not mean that the terminal receives only one sidelink HARQ-ACK bit or that the terminal transmits only one Uu HARQ-ACK bit, and that these different sidelink HARQ-ACK bits may come from different feedback resources (for example, PSFCH or PSSCH) or correspond to different sidelink transmissions.

If one sidelink HARQ-ACK bit in the received sidelink HARQ-ACK information indicates ACK, it is considered that the bit corresponds to a Uu HARQ-ACK bit and that the Uu HARQ-ACK bit indicates ACK; and if one sidelink HARQ-ACK bit in the sidelink HARQ-ACK information received on the sidelink indicates NACK, it is considered that the sidelink HARQ-ACK bit corresponds to a Uu HARQ-ACK bit and that the Uu HARQ-ACK bit indicates NACK.

In this method embodiment, after receiving N-bit sidelink HARQ-ACK information, the terminal determines corresponding N-bit Uu HARQ-ACK information and transmits the N-bit Uu HARQ-ACK information to the control node on a corresponding PUCCH resource.

In an optional example, one PSFCH resource corresponds to one PUCCH resource, which means that after receiving the N-bit sidelink HARQ-ACK information on a PSFCH resource, the terminal determines corresponding N-bit Uu HARQ-ACK information and transmits the N-bit Uu HARQ-ACK information to the control node on a corresponding PUCCH resource. In addition to the PSFCH, it may also be a PSSCH that carries the sidelink HARQ-ACK information, and in addition to the PUCCH, it may also be a PUSCH that carries UCI. Any combination can be made, and details are not described.

Method 2: Every K1 sidelink HARQ-ACK bits correspond to T1 Uu HARQ-ACK bits (by compression or expansion).

Note that this does not mean that the terminal receives only K1 sidelink HARQ-ACK bits or that the terminal transmits only T1 Uu HARQ-ACK bits, and that these K1 bits may come from different feedback resources (for example, PSFCH or PSSCH) or correspond to different sidelink transmissions.

The method 2 includes method 2.1 and method 2.2.

Method 2.1: For K1>T1, calculation is performed on K1 sidelink HARQ-ACK bits according to a preset method to obtain a T1-bit result. If one bit in the result indicates ACK, it is considered that the bit corresponds to a Uu HARQ-ACK bit, and that the Uu HARQ-ACK bit indicates ACK; and if one bit in the result indicates NACK, it is considered that the bit corresponds to a Uu HARQ-ACK bit, and that the Uu HARQ-ACK bit indicates NACK. Based on this principle, T1-bit Uu HARQ-ACK information is determined.

For example, after receiving K1-bit sidelink HARQ-ACK information, the terminal determines corresponding T1-bit Uu HARQ-ACK and transmits the T1-bit Uu HARQ-ACK to the control node on a corresponding PUCCH resource, where T1 is not equal to K1. In this case, every K1/T1 sidelink transmissions correspond to one Uu HARQ-ACK bit.

After the control node receives the T1-bit Uu HARQ-ACK information, its behavior includes at least one of the following: For K1/T1 sidelink transmissions corresponding to bits indicated as NACKs, it is considered that the transmissions have failed, and the control node can transmit scheduling signaling to schedule the terminal to perform retransmission.

In an embodiment, when T1=1, that is, after receiving K1-bit sidelink HARQ-ACK information, the terminal determines corresponding 1-bit Uu HARQ-ACK information and transmits the 1-bit Uu HARQ-ACK information to the control node on a corresponding PUCCH resource. In this case, every K1 sidelink transmissions correspond to one Uu HARQ-ACK bit. After the control node receives the 1-bit Uu HARQ-ACK information, its behavior includes at least one of the following: If the bit indicates NACK, the control node considers that the K1 sidelink transmissions have failed. Further optionally, the control node may schedule the terminal to retransmit the K1 sidelink transmissions by transmitting scheduling signaling. In addition to the PSFCH, it may also be a PSSCH that carries the sidelink information, and in addition to the PUCCH, it may also be a PUSCH that carries UCI. Any combination can be made, and details are not described.

When T1 is greater than 1, the preset method may include at least one of the following:

when consecutive K1/T1 sidelink HARQ-ACK bits do not all indicate ACKs, a corresponding 1-bit Uu HARQ-ACK bit indicates NACK, and when consecutive K1/T1 sidelink HARQ-ACK bits all indicate ACKs, a corresponding 1-bit Uu HARQ-ACK bit indicates ACK; and when consecutive K1/T1 sidelink HARQ-ACK bits do not all indicate NACKs, a corresponding 1-bit Uu HARQ-ACK bit indicates ACK, and when consecutive K1/T1 sidelink HARQ-ACK bits all indicate NACKs, a corresponding 1-bit Uu HARQ-ACK bit indicates NACK.

An AND operation is performed. It should be understood that the foregoing AND operation may include two operation types: AND and Bitwise AND. Taking the AND as an example, if an AND operation is performed on consecutive K1/T1 sidelink HARQ-ACK bits, a calculated result corresponds to one Uu HARQ-ACK bit, and concatenation is performed on all calculated bits, to finally obtain corresponding M-bit Uu HARQ-ACK.

A modulo 2 operation is performed on a sum. For example, a modulo 2 operation is performed on a bitwise sum of every consecutive K1/T1 sidelink HARQ-ACK bits, a calculated result corresponds to one Uu HARQ-ACK bit, to finally obtain corresponding M-bit Uu HARQ-ACK.

An OR operation is performed. For example, an OR operation is performed on every consecutive K1/T1 sidelink HARQ-ACK bits, a calculated result corresponds to one Uu HARQ-ACK bit, to finally obtain corresponding M-bit Uu HARQ-ACK.

An XOR operation is performed. For example, an XOR operation is performed on every consecutive K1/T1 sidelink HARQ-ACK bits, a calculated result corresponds to one Uu HARQ-ACK bit, to finally obtain corresponding M-bit Uu HARQ-ACK.

A value taken corresponds to a range. For example, when a value of K1/T1 bits is in a range, one corresponding Uu HARQ-ACK bit indicates ACK; and for example, when a value of K1/T1 bits is in another range, one corresponding Uu HARQ-ACK bit indicates NACK.

Method 2.2: For K1<T1, the method 2.2 includes method 2.2.1 and method 2.2.2.

Method 2.2.1: an 0-bit fix state is added to K1 sidelink HARQ-ACK bits to obtain a T1-bit result. If one bit in the result indicates ACK, it is considered that the bit corresponds to a Uu HARQ-ACK bit, and that the bit indicates ACK; and if the result indicates NACK, it is considered that the bit corresponds to a Uu HARQ-ACK bit, and the bit indicates NACK. Based on this principle, T1-bit Uu HARQ-ACK information is determined.

In an optional embodiment, K1 sidelink HARQ-ACK bits may be first mapped to K1-bit Uu HARQ-ACK information according to the description in method 1, and then padded with O bits.

In an optional embodiment, K1 sidelink HARQ-ACK bits may be first mapped to one- or more-bit Uu HARQ-ACK information according to the description in the method 2.1, and then padded with O bits.

In an optional embodiment, K1 sidelink HARQ-ACK bits may be first padded with O bits, and then mapped to T1-bit Uu HARQ-ACK information according to the description in the method 2.1.

Optionally, the additional O bits indicate an O-bit 0, or an O-bit NACK, or an O-bit other fixed state, or 0-bit redundant bits, or 0-bit parity bits.

For example, T1=Q*K1. After receiving the N-bit sidelink HARQ-ACK information, the terminal determines corresponding M-bit Uu HARQ-ACK and transmits the M-bit Uu HARQ-ACK to the control node on a corresponding PUCCH resource, where T1 is not equal to K1. In this case, each sidelink transmission corresponds to T1/K1 Uu HARQ-ACK bits.

After the control node receives the T1-bit Uu HARQ-ACK information, its behavior includes at least one of the following:

if bits decoded by the control node (only part of the information can be decoded) from T1/K1 Uu HARQ-ACK bits corresponding to a sidelink transmission all indicate NACK, it is considered that the sidelink transmission has failed; and if T1/K1 Uu HARQ-ACK bits corresponding to a sidelink transmission must be completely decoded by the control node (required to be fully decoded) and all indicate NACK, it is considered that the sidelink transmission has failed; and if at least one bit decoded from Q Uu HARQ-ACK bits corresponding to a sidelink transmission indicates ACK, it is considered that the sidelink transmission has succeeded.

Further optionally, the control node may schedule the terminal to retransmit the sidelink transmission by transmitting scheduling signaling.

One more preferred example is that Q equals to 1, 2, 4, or 8.

It should be noted that in the foregoing embodiment, the mapping methods are described when T1 is divisible by K1. For a case in which T1 is not divisible by K1, mapping can be further implemented by inserting one or more bits.

Method 2.2.2: A T1-bit result is obtained by repeating (repeat) K1 sidelink HARQ-ACK bits. If one bit in the result indicates ACK, it is considered that the bit corresponds to a Uu HARQ-ACK bit, and that the bit indicates ACK; and if the result indicates NACK, it is considered that the bit corresponds to a Uu HARQ-ACK bit, and that the bit indicates NACK. Based on this principle, T1-bit Uu HARQ-ACK information is determined.

For example, T1=Q*K1, and the foregoing repeating method may include the following two options:

1. Each of the K1 sidelink HARQ-ACK bits is repeated T1/K1 times, and then the bits are concatenated. For example, K1=4, T1=8, four sidelink HARQ-ACK bits are 1100, then a concatenated bitmap is 11110000; and 2. The K1 sidelink HARQ-ACK bit information is concatenated T1/K1 times. For example, K1=4, T1=8, 4 sidelink HARQ-ACK bits are 1100, then the concatenated bitmap is 11001100.

Method 2.3: Step 1. Determine a first bit sequence associated with a bit sequence formed by the K1 sidelink HARQ-ACK bits as Uu HARQ-ACK information corresponding to the K1 sidelink HARQ-ACK bits.

Specifically, the first bit sequence may be obtained in a form of a look-up table. A mapping relationship between the first bit sequence and another bit sequence may be stored in the table. The mapping relationship may be a one-to-one mapping or a one-to-many mapping relationship, that is, one first bit sequence corresponds to a plurality of another bit sequences. The another bit sequence may be regarded as a bit sequence formed by K1 sidelink HARQ-ACK bits. A relationship between the number of bits in the bit sequence formed by the K1 sidelink HARQ-ACK bits and the number of bits in the first bit sequence may be set according to an actual requirement, which is not further limited herein. For example, when the bit sequence formed by the K1 sidelink HARQ-ACK bits is 01, the associated first bit sequence is 0000.

The mapping relationship between the first bit sequence and another bit sequence may be configured by a network side, pre-configured by the network side, prescribed by a protocol, negotiated between terminals, or indicated by another terminal.

Step 2. Determine a target resource for transmitting the Uu HARQ-ACK information, where the target resource may be one or more resources.

Step 3. Transmit Uu HARQ-ACK information on the determined target resource.

It is assumed that a PSFCH resource corresponds to L PUCCH resource. After receiving the sidelink HARQ-ACK bit information on A PSFCHs, the terminal determines corresponding Uu HARQ-ACK bit information and PUCCH resources, and transmits the Uu HARQ-ACK bit information on the A*L PUCCH resources. Transmitting methods include one of the following:

dividing the Uu HARQ-ACK bit information into A*L parts, and transmitting different parts of the Uu HARQ-ACK bit information on different PUCCHs; and transmitting all bits of the Uu HARQ-ACK information on each PUCCH, that is, repeatedly transmitting the Uu HARQ-ACK information on A*L PUCCHs.

Step 4. The terminal receives scheduling signaling that indicates to perform sidelink resource allocation.

The scheduling signaling indicates a plurality of sidelink transmissions to be retransmitted (in this case, in addition to resource allocation, the scheduling signaling indicates whether the resource is used for initial transmission or retransmission).

In an embodiment, the scheduling signaling includes at least a new data indicator (NDI), indicating whether the terminal performs retransmission. Possible behaviors by the terminal may include:

Behavior 1: The terminal performs retransmission based on a situation actually indicated by sidelink HARQ-ACK information in previously obtained sidelink information. To be specific, for a transmission for which scheduling signaling indicates retransmission but corresponding sidelink HARQ-ACK information indicates ACK, no retransmission is performed, and for a transmission for which scheduling signaling indicates retransmission and corresponding sidelink HARQ-ACK information indicates NACK, retransmission is performed;

Behavior 2: The terminal directly performs retransmission according to an indicator in the scheduling signaling, that is, if the scheduling signaling indicates retransmission, all sidelink transmissions corresponding to the signaling are retransmitted; and Behavior 3: The terminal performs retransmission according to transmitted Uu HARQ-ACK information, that is, retransmission is performed for transmission of Uu HARQ-ACK information with NACK.

For Behavior 1, one implementation is to repeat the determined T1-bit Uu HARQ-ACK information K1/T1 times, and perform an XOR, or OR, or AND operation on corresponding bits of the repeated bits and the K1-bit sidelink HARQ-ACK information. For an SL transmission corresponding to a bit with a specific value in the calculation result, the terminal perform retransmission, otherwise it performs no retransmission.

Further optionally, a resource allocated to a sidelink transmission corresponding to a bit with a non-specific value in the scheduling signaling may be used by the terminal for transmission of other transmission blocks, or for retransmission of a sidelink transmission that the terminal determines necessary to be retransmitted.

For an example of an XOR operation: More specifically, T1=1, K1=4 bits, and 1-bit Uu HARQ-ACK indicates NACK. It is assumed that 0 means NACK and 1 means ACK, so that repeating the bit four times gets 0000. However, 4-bit sidelink HARQ-ACK information actually received by the terminal is 1101, and the four bits correspond to transport block (TB) 1, TB2, TB3, and TB4 on the sidelink respectively. In this case, a Bitwise XOR operation is performed on 1101 and 0000, and an obtained result is 1101. It is assumed that the specific value is 0, the terminal retransmits TB3 in this case, and performs no retransmission of TB1, TB2, and TB4 that are indicated for retransmission in the scheduling signaling. Further optionally, resources allocated to TB1, TB2, and TB4 in the scheduling signaling may also be used for retransmission of TB3, or may be used for transmission of a new TB.

For an example of an OR operation: More specifically, T1=1, K1=4 bits, and 1-bit Uu HARQ-ACK indicates NACK. It is assumed that 0 means NACK and 1 means ACK, so that repeating the bit four times gets 0000. However, 4-bit sidelink HARQ-ACK information actually received by the terminal is 1101, and the four bits correspond to TB1, TB2, TB3, and TB4 on the sidelink respectively. In this case, a Bitwise OR operation is performed on 1101 and 0000, and an obtained result is 1101. It is assumed that the specific value is 0, the terminal retransmits TB3 in this case, and performs no retransmission of TB1, TB2, and TB4 that are indicated for retransmission in the scheduling signaling. Further optionally, resources allocated to TB1, TB2, and TB4 in the scheduling signaling may also be used for retransmission of TB3, or may be used for transmission of a new TB.

For an example of an AND operation: More specifically, T1=1, K1=4 bits, and 1-bit Uu HARQ-ACK indicates NACK. It is assumed that 0 means NACK and 1 means ACK, so that repeating the bit four times gets 0000. However, 4-bit sidelink HARQ-ACK information actually received by the terminal is 1101, and the four bits correspond to TB1, TB2, TB3, and TB4 on the sidelink respectively. In this case, a Bitwise AND operation is performed on 1101 and 0000, and an obtained result is 1101. It is assumed that the specific value is 0, the terminal retransmits TB3 in this case, and performs no retransmission of TB1, TB2, and TB4 that are indicated for retransmission in the scheduling signaling. Further optionally, resources allocated to TB1, TB2, and TB4 in the scheduling signaling may also be used for retransmission of TB3, or may be used for transmission of a new TB.

It should be noted that the sidelink transmission includes at least one of a transmission that actually has occurred and a transmission that has not occurred, where the transmission is transmitting or receiving.

It should be understood that for a sidelink control node, the mapping and transmission of sidelink information is basically the same as the mapping and transmission of a Uu control node, except that the target resources used are different and Uu HARQ-ACK information is replaced with sidelink HARQ-ACK information. For details, reference may be made to the description of the foregoing instances, and description is not repeated herein.

Figure 3:
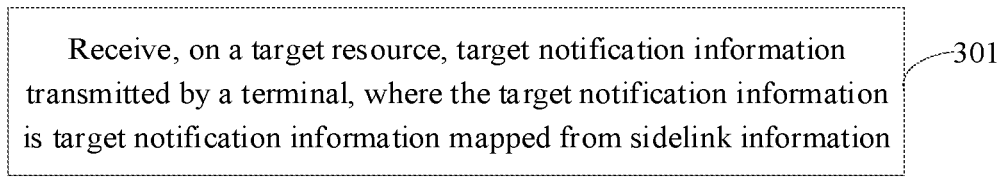
FIG. 3 is a second flowchart of a sidelink information transmission method according to some embodiments of this disclosure.

FIG. 3 is a flowchart of another sidelink information transmission method according to some embodiments of this disclosure. The method is applied to a control node. As shown in FIG. 3, the method includes the following step:

Step 301. Receive, on a target resource, target notification information transmitted by a terminal, where the target notification information is target notification information mapped from sidelink information.

Optionally, a mode of mapping the sidelink information to the target notification information includes at least one of the following:

mapping each bit of N1 first bits to one second bit;

mapping N2 first bits to M1 second bits;

mapping N3 bits to W second bits according to a preset mode; and determining a first bit sequence associated with a bit sequence formed by N4 first bits as indication information of second bits corresponding to the N4 first bits; where the first bits are bits in the sidelink information, the second bits are bits in the target notification information, N1, N2, and W are all positive integers, N3 and N4 are integers greater than 1, M1 is an integer greater than N2, and N3 is greater than W.

Optionally, the mapping N2 first bits to M1 second bits includes any one of the following:

after mapping the N2 first bits to M2 second bits, inserting a second bit sequence of M3 bits in the M2 second bits to obtain the M1 second bits;

after inserting a third bit sequence of M4 bits in the N2 first bits, mapping combined bits of the N2 first bits and the third bit sequence to the M1 second bits;

after repeating each bit of the N2 first bits at least once, performing concatenation to obtain the M1 second bits;

after repeating each bit of the N2 first bits at least once, performing concatenation and inserting at least one fourth bit sequence to obtain the M1 second bits;

concatenating at least two target objects to obtain the M1 second bits; and after concatenating at least two target objects, inserting at least one fourth bit sequence to obtain the M1 second bits; where the target objects are the N2 first bits, and M2, M3, and M4 are all positive integers.

Optionally, the second bit sequence is any one of the following:

M3 fixed states;

M3 redundant bits; and

M3 parity bits.

Optionally, the mapping N2 first bits to M2 second bits includes:

mapping each bit of the N2 first bits to one second bit; and mapping N3 bits of the N2 first bits to W second bits according to a preset mode, where N3 and W are positive integers, and N3 is greater than W.

Optionally, the mapping combined bits of the N2 first bits and the third bit sequence to the M1 second bits includes:

mapping each bit of the combined bits to one second bit; and mapping N3 bits of the combined bits to W second bits according to a preset mode, where N3 and W are positive integers, and N3 is greater than W.

Optionally, the preset mode includes at least one of the following:

in a case that at least two bits include at least one bit for indicating a first value, one second bit corresponding to the at least two bits indicates the first value, where the at least two bits are bits of the N3 bits;

in a case that the at least two bits all indicate a second value, one second bit corresponding to the at least two bits indicates the second value;

in a case that the at least two bits include at least one bit for indicating a second value, one second bit corresponding to the at least two bits indicates the second value;

in a case that the at least two bits all indicate a first value, one second bit corresponding to the at least two bits indicates the first value;

an AND operation is performed on the at least two bits to obtain indication information of one second bit corresponding to the at least two bits;

a modulo P operation is performed on a sum of the N3 bits to obtain indication information of the W second bits, where P is an integer greater than 1;

an OR operation is performed on the at least two bits to obtain indication information of one second bit corresponding to the at least two bits;

an XOR operation is performed on the at least two bits to obtain indication information of one second bit corresponding to the at least two bits; and indication information of one second bit corresponding to the at least two first bits is determined based on an interval range to which values corresponding to the at least two bits belong.

Optionally, the method further includes:

transmitting scheduling signaling to the terminal, where the scheduling signaling is used to indicate a sidelink resource.

Optionally, the scheduling signaling is further used to indicate whether the sidelink resource is used for retransmission or initial transmission.

Optionally, in a case that the target resource is provided in plurality, the receiving, on a target resource, target notification information transmitted by a terminal includes:

receiving the target notification information on the plurality of target resources.

It should be noted that this embodiment is used as an embodiment of a control node corresponding to the embodiment shown in FIG. 2, and for specific implementations of this embodiment, reference may be made to the relevant descriptions about the embodiment shown in FIG. 2, with the same beneficial effects achieved. To avoid repetition, details are not described herein again.

Figure 4:
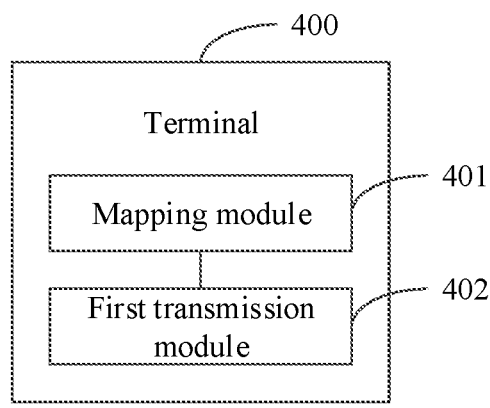
FIG. 4 is a structural diagram of a terminal according to some embodiments of this disclosure.

FIG. 4 is a structural diagram of a terminal according to some embodiments of this disclosure. As shown in FIG. 4, the terminal 400 includes:

a mapping module 401, configured to map sidelink information to target notification information; and a first transmission module 402, configured to transmit the target notification information on a target resource.

Optionally, a mode of mapping the sidelink information to the target notification information includes at least one of the following:

mapping each bit of N1 first bits to one second bit;

mapping N2 first bits to M1 second bits;

mapping N3 bits to W second bits according to a preset mode; and determining a first bit sequence associated with a bit sequence formed by N4 first bits as indication information of second bits corresponding to the N4 first bits; where the first bits are bits in the sidelink information, the second bits are bits in the target notification information, N1, N2, and W are all positive integers, N3 and N4 are integers greater than 1, M1 is an integer greater than N2, and N3 is greater than W.

Optionally, the mapping N2 first bits to M1 second bits includes any one of the following:

after mapping the N2 first bits to M2 second bits, inserting a second bit sequence of M3 bits in the M2 second bits to obtain the M1 second bits;

after inserting a third bit sequence of M4 bits in the N2 first bits, mapping combined bits of the N2 first bits and the third bit sequence to the M1 second bits;

after repeating each bit of the N2 first bits at least once, performing concatenation to obtain the M1 second bits;

after repeating each bit of the N2 first bits at least once, performing concatenation and inserting at least one fourth bit sequence to obtain the M1 second bits;

concatenating at least two target objects to obtain the M1 second bits; and after concatenating at least two target objects, inserting at least one fourth bit sequence to obtain the M1 second bits; where the target objects are the N2 first bits, and M2, M3, and M4 are all positive integers.

Optionally, the second bit sequence is any one of the following:

M3 fixed states;

M3 redundant bits; and

M3 parity bits.

Optionally, the mapping N2 first bits to M2 second bits includes:

mapping each bit of the N2 first bits to one second bit; and mapping N3 bits of the N2 first bits to W second bits according to a preset mode, where N3 and W are positive integers, and N3 is greater than W.

Optionally, the mapping combined bits of the N2 first bits and the third bit sequence to the M1 second bits includes:

mapping each bit of the combined bits to one second bit; and mapping N3 bits of the combined bits to W second bits according to a preset mode, where N3 and W are positive integers, and N3 is greater than W.

Optionally, the preset mode includes at least one of the following:

in a case that at least two bits include at least one bit for indicating a first value, one second bit corresponding to the at least two bits indicates the first value, where the at least two bits are bits of the N3 bits;

in a case that the at least two bits all indicate a second value, one second bit corresponding to the at least two bits indicates the second value;

in a case that the at least two bits include at least one bit for indicating a second value, one second bit corresponding to the at least two bits indicates the second value;

in a case that the at least two bits all indicate a first value, one second bit corresponding to the at least two bits indicates the first value;

an AND operation is performed on the at least two bits to obtain indication information of one second bit corresponding to the at least two bits;

a modulo P operation is performed on a sum of the N3 bits to obtain indication information of the W second bits, where P is an integer greater than 1;

an OR operation is performed on the at least two bits to obtain indication information of one second bit corresponding to the at least two bits;

an XOR operation is performed on the at least two bits to obtain indication information of one second bit corresponding to the at least two bits; and indication information of one second bit corresponding to the at least two first bits is determined based on an interval range to which values corresponding to the at least two bits belong.

Optionally, the first transmission module 402 is further configured to:

receive scheduling signaling transmitted by a control node, where the scheduling signaling is used to indicate a sidelink resource; and perform sidelink transmission on the sidelink resource.

Optionally, the scheduling signaling is further used to indicate whether the sidelink resource is used for retransmission or initial transmission.

Optionally, the performing sidelink transmission on the sidelink resource includes one of the following:

performing sidelink retransmission of sidelink data corresponding to first sidelink information, where the first sidelink information is sidelink information for which first bits indicate a negative acknowledgement character;

performing sidelink retransmission of sidelink data corresponding to second sidelink information, where the second sidelink information is sidelink information corresponding to a negative acknowledgement character indicated by a second bit; and in a case that the control node indicates to retransmit sidelink data, performing sidelink retransmission of the sidelink data that is indicated to be retransmitted.

Optionally, in a case that the target resource is provided in plurality, the first transmission module 402 is specifically configured to transmitting the target notification information on the plurality of target resources.

The terminal provided in some embodiments of this disclosure can implement the processes implemented by the terminal in the method embodiment in FIG. 4. To avoid repetition, details are not described herein again.

Figure 5:
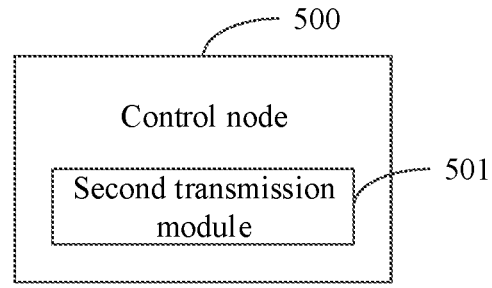
FIG. 5 is a structural diagram of a control node according to some embodiments of this disclosure.

FIG. 5 is a schematic structural diagram of a control node according to some embodiments of this disclosure. As shown in FIG. 5, the control node 500 includes:

a second transmission module 501, configured to receive, on a target resource, target notification information transmitted by a terminal, where the target notification information is target notification information mapped from sidelink information.

Optionally, a mode of mapping the sidelink information to the target notification information includes at least one of the following:

mapping each bit of N1 first bits to one second bit;
mapping N2 first bits to M1 second bits;
mapping N3 bits to W second bits according to a preset mode; and determining a first bit sequence associated with a bit sequence formed by N4 first bits as indication information of second bits corresponding to the N4 first bits; where the first bits are bits in the sidelink information, the second bits are bits in the target notification information, N1, N2, and W are all positive integers, N3 and N4 are integers greater than 1, M1 is an integer greater than N2, and N3 is greater than W.

Optionally, the mapping N2 first bits to M1 second bits includes any one of the following:

after mapping the N2 first bits to M2 second bits, inserting a second bit sequence of M3 bits in the M2 second bits to obtain the M1 second bits;

after inserting a third bit sequence of M4 bits in the N2 first bits, mapping combined bits of the N2 first bits and the third bit sequence to the M1 second bits;

after repeating each bit of the N2 first bits at least once, performing concatenation to obtain the M1 second bits;

after repeating each bit of the N2 first bits at least once, performing concatenation and inserting at least one fourth bit sequence to obtain the M1 second bits;

concatenating at least two target objects to obtain the M1 second bits; and after concatenating at least two target objects, inserting at least one fourth bit sequence to obtain the M1 second bits; where the target objects are the N2 first bits, and M2, M3, and M4 are all positive integers.

Optionally, the second bit sequence is any one of the following:

M3 fixed states;
M3 redundant bits; and
M3 parity bits.

Optionally, the mapping N2 first bits to M2 second bits includes:

mapping each bit of the N2 first bits to one second bit; and
mapping N3 bits of the N2 first bits to W second bits according to a preset mode, where N3 and W are positive integers, and N3 is greater than W.

Optionally, the mapping combined bits of the N2 first bits and the third bit sequence to the M1 second bits includes:

mapping each bit of the combined bits to one second bit; and mapping N3 bits of the combined bits to W second bits according to a preset mode, where N3 and W are positive integers, and N3 is greater than W.

Optionally, the preset mode includes at least one of the following:

in a case that at least two bits include at least one bit for indicating a first value, one second bit corresponding to the at least two bits indicates the first value, where the at least two bits are bits of the N3 bits;

in a case that the at least two bits all indicate a second value, one second bit corresponding to the at least two bits indicates the second value;

in a case that the at least two bits include at least one bit for indicating a second value, one second bit corresponding to the at least two bits indicates the second value;

in a case that the at least two bits all indicate a first value, one second bit corresponding to the at least two bits indicates the first value;

an AND operation is performed on the at least two bits to obtain indication information of one second bit corresponding to the at least two bits;

a modulo P operation is performed on a sum of the N3 bits to obtain indication information of the W second bits, where P is an integer greater than 1;

an OR operation is performed on the at least two bits to obtain indication information of one second bit corresponding to the at least two bits;

an XOR operation is performed on the at least two bits to obtain indication information of one second bit corresponding to the at least two bits; and indication information of one second bit corresponding to the at least two first bits is determined based on an interval range to which values corresponding to the at least two bits belong.

Optionally, the second transmission module 501 is further configured to transmit scheduling signaling to the terminal, where the scheduling signaling is used to indicate a sidelink resource.

Optionally, the scheduling signaling is further used to indicate whether the sidelink resource is used for retransmission or initial transmission.

Optionally, in a case that the target resource is provided in plurality, the second transmission module 501 is specifically configured to:

receive the target notification information on the plurality of target resources.

The control node provided in some embodiments of this disclosure can implement the processes implemented by the control node in the method embodiment in FIG. 3, and details are not described here again to avoid repetition.

Figure 6:
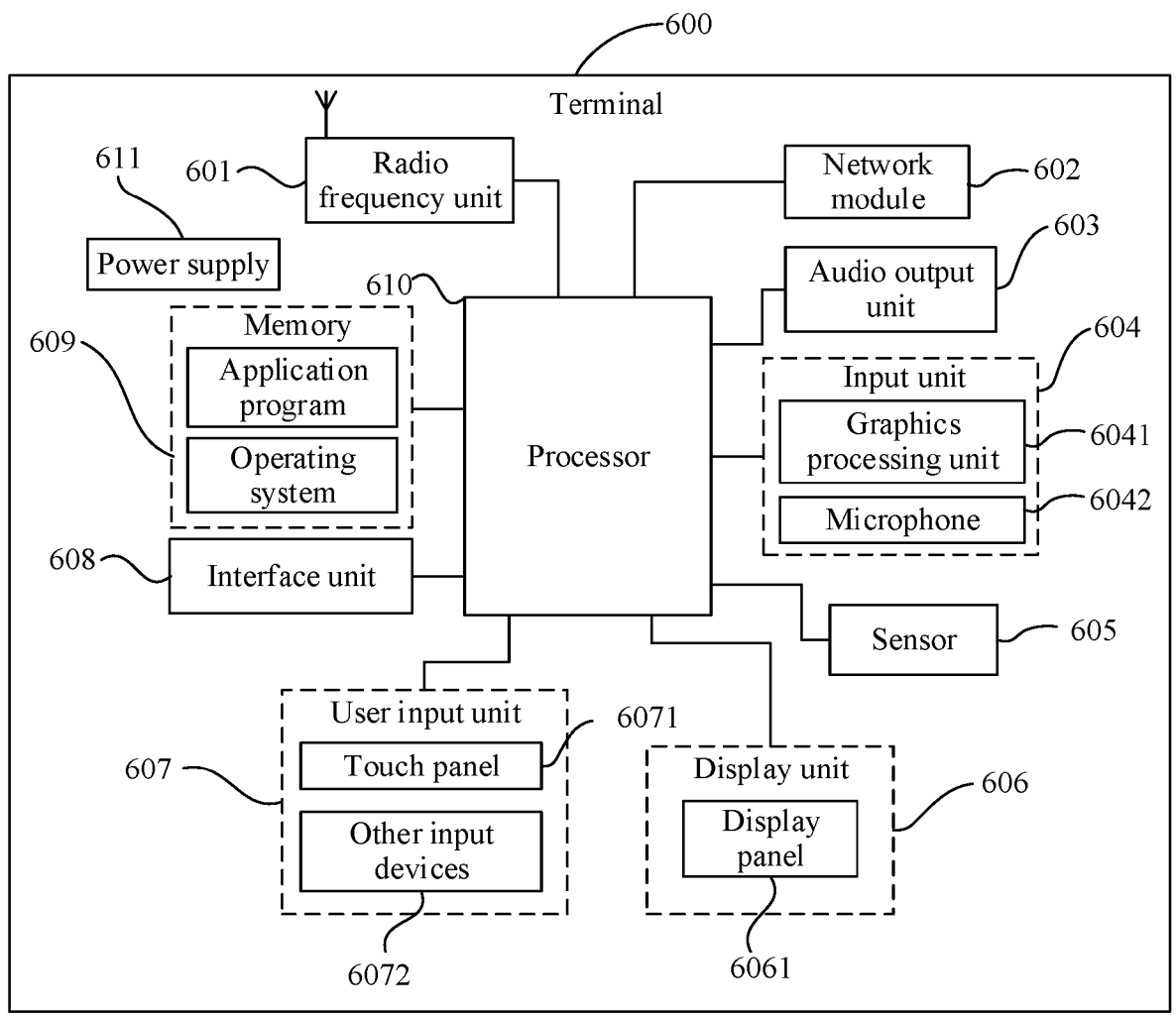
FIG. 6 is another structural diagram of a terminal according to some embodiments of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. Persons skilled in the art may understand that the structure of the terminal shown in FIG. 6 does not constitute any limitation on the terminal. The terminal may include more or fewer components than those shown in the figure, or a combination of some components, or the components disposed differently. In some embodiments of this disclosure, the terminal includes but is not limited to a mobile phone, a tablet computer, a laptop computer, a palmtop computer, an in-vehicle terminal, a wearable device, a pedometer, and the like.

The processor 610 is configured to map sidelink information to target notification information.

The radio frequency unit 601 is configured to transmit the target notification information on a target resource.

In some embodiments of this disclosure, mapping the sidelink information to the target notification information can help a control node to understand the sidelink information, implementing transmission of the sidelink information.

It should be understood that in some embodiments of this disclosure, the radio frequency unit 601 may be configured to: receive and transmit signals in an information receiving/sending process or a call process; and specifically, after receiving downlink data from a base station, transmit the downlink data to the processor 610 for processing; and in addition, transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal, and output the audio signal as a sound. In addition, the audio output unit 603 may further provide audio output (for example, a call signal reception tone or a message reception tone) that is related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or transmitted by the radio frequency unit 601 or the network module 602. The microphone 6042 can receive sounds and processing such sounds into audio data. The processed audio data may be converted in a telephone call mode into a format that can be transmitted by the radio frequency unit 601 to a mobile communications base station, for outputting.

The terminal 600 further includes at least one sensor 605, for example, an optical sensor, a motion sensor, and other sensors. Specifically, the optical sensor may include an ambient light sensor and a proximity sensor. The ambient light sensor may adjust luminance of the display panel 6061 based on brightness of ambient light, and the proximity sensor may turn off a display panel 6061 and/or backlight when the terminal 600 moves close to an ear. As a motion sensor, an accelerometer sensor may detect a value of an acceleration in various directions (there are usually three axes), may detect a value and a direction of gravity when the terminal is still, and may be applied to terminal posture recognition (for example, landscape/portrait mode switching, related games, and magnetometer posture calibration), functions related to vibration recognition (for example, a pedometer or a tapping), and the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information input by the user or information provided for the user. The display unit 606 may include the display panel 6061. The display panel 6061 may be configured in a form of a liquid crystal display (LCD), an organic light-emitting diode (OLED), or the like.

The user input unit 607 may be used to receive input digit or character information, and generate key signal input that is related to user setting and function control of the terminal. Specifically, the user input unit 607 includes a touch panel 6071 and other input devices 6072. The touch panel 6071, also referred to as a touchscreen, may capture a touch operation performed by a user on or near the touch panel 6071 (for example, an operation performed by the user on the touch panel 6071 or near the touch panel 6071 by using a finger or any appropriate object or accessory such as a stylus). The touch panel 6071 may include two parts: a touch detection apparatus and a touch controller. The touch detection apparatus detects a touch position of the user, detects a signal carried by a touch operation, and transmits the signal to the touch controller. The touch controller receives touch information from the touch detection apparatus, converts the touch information into point coordinates, transmits the point coordinates to the processor 610, and receives and executes a command transmitted by the processor 610. In addition, the touch panel 6071 may be implemented in a plurality of forms, for example, as a resistive, capacitive, infrared, or surface acoustic wave touch panel. In addition to the touch panel 6071, the user input unit 607 may further include other input devices 6072. Specifically, the other input devices 6072 may include but are not limited to a physical keyboard, a function key (for example, a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 for determining a type of the touch event. Then, the processor 610 provides a corresponding visual output on the display panel 6061 based on the type of the touch event. Although in FIG. 6, the touch panel 6071 and the display panel 6061 act as two independent parts to implement input and output functions of the terminal, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be used to receive input (for example, data information and electric power) from the external apparatus, and transmit the received input to one or more elements in the terminal 600; or may be used to transmit data between the terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, and may further include a non-volatile memory such as a disk storage device, a flash memory device, or another volatile solid-state storage device.

The processor 610 is a control center of the terminal, and is connected to all components of the terminal by using various interfaces and lines. By running or executing a software program and/or a module stored in the memory 609 and invoking data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It can be understood that the modem processor may alternatively be not integrated in the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein again.

Optionally, some embodiments of this disclosure further provide a terminal, including a processor 610, a memory 609, and a program stored in the memory 609 and capable of running on the processor 610. When the program is executed by the processor 610, the processes of the foregoing embodiments of the sidelink information transmission method are implemented, with same technical effects achieved. To avoid repetition, details are not described herein again.

Figure 7:
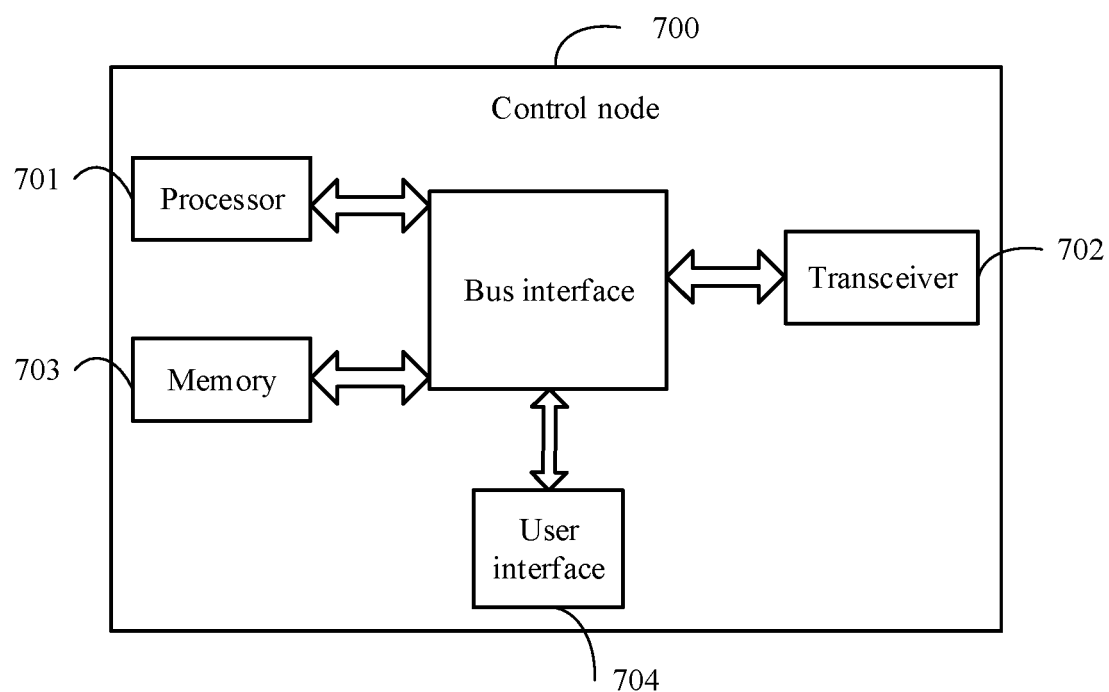
FIG. 7 is another structural diagram of a control node according to some embodiments of this disclosure.

FIG. 7 is a structural diagram of another control node according to some embodiments of this disclosure. As shown in FIG. 7, the control node 700 includes a processor 701, a transceiver 702, a memory 703, and a bus interface.

The transceiver 702 is configured to receive, on a target resource, target notification information transmitted by a terminal, where the target notification information is target notification information mapped from sidelink information.

In some embodiments of this disclosure, mapping the sidelink information to the target notification information can help a control node to understand the sidelink information, implementing transmission of the sidelink information.

In FIG. 7, a bus architecture may include any quantity of interconnected buses and bridges, and specifically connect together various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides interfaces. The transceiver 702 may be a plurality of components, including a transmitter and a receiver, and provides units for communicating with a variety of other apparatuses on a transmission medium. For different user equipment, the user interface 704 may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 703 may store data used by the processor 701 when the processor 701 performs an operation.

Optionally, some embodiments of this disclosure further provide a control node, including a processor 701, a memory 703, and a program stored in the memory 703 and capable of running on the processor 701. When the program is executed by the processor 701, the processes of the foregoing embodiments of the sidelink information transmission method are implemented, with same technical effects achieved. To avoid repetition, details are not described herein again.

Some embodiments of this disclosure further provide a readable storage medium, where the readable storage medium stores a program, and when the program is executed by a processor, the processes in the embodiments of the sidelink information transmission method provided in some embodiments of this disclosure are implemented, with same technical effects achieved. To avoid repetition, details are not described herein again. For example, the readable storage medium is a read-only memory (ROM), a random access memory (RAM), a magnetic disk, an optical disc, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of this disclosure.

It can be understood that the embodiments described in some embodiments of the present disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

For software implementation, the technologies described in some embodiments of the present disclosure may be implemented by modules (such as processes and functions) that perform the functions described in some embodiments of the present disclosure. Software code may be stored in the memory and executed by the processor. The memory may be implemented in the processor or external to the processor.

Therefore, the objectives of this disclosure can also be implemented by running a program or a set of programs on any computing apparatus. The computing apparatus may be a well-known general-purpose apparatus. Therefore, the objective of this disclosure may also be achieved by merely providing a program product including program code for implementing the method or apparatus. Therefore, such program product also constitutes this disclosure, and a storage medium storing such program product also constitutes this disclosure. Apparently, the storage medium may be any storage medium of common sense or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in time sequence following the order of description, but are not necessarily performed in time sequence. Some steps may be performed in parallel or separate from each other.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A sidelink information transmission method, applied to a terminal and comprising:
    mapping sidelink information to target notification information, wherein the sidelink information comprises at least one of sidelink hybrid automatic repeat request acknowledgement (sidelink HARQ-ACK) information corresponding to one or more sidelink transmissions, a sidelink scheduling request, and channel state information; and
    transmitting the target notification information on a target resource, wherein the target resource is a physical uplink control channel (PUCCH) or physical uplink shared channel (PUSCH);
    wherein a mode of mapping the sidelink information to the target notification information comprises: mapping N3 first bits to W second bits according to a preset mode, W is a positive integer, N3 is an integer greater than 1, and N3 is greater than W; and
    the first bits are bits in the sidelink information, the second bits are bits in the target notification information.

2. The method according to claim 1, wherein the preset mode comprises:
    in a case that at least two bits comprise at least one bit indicating a first value, one second bit corresponding to the at least two bits indicates the first value, wherein the at least two bits are bits of the N3 first bits;
    in a case that the at least two bits all indicate a second value, one second bit corresponding to the at least two bits indicates the second value;
    or,
    in a case that the at least two bits comprise at least one bit indicating a second value, one second bit corresponding to the at least two bits indicates the second value;
    in a case that the at least two bits all indicate a first value, one second bit corresponding to the at least two bits indicates the first value.

3. The method according to claim 2, wherein the preset mode comprises:
    a modulo P operation is performed on a sum of the N3 first bits to obtain indication information of the W second bits, wherein P is an integer greater than 1.

4. The method according to claim 2, wherein the preset mode comprises:
an AND operation is performed on the at least two bits to obtain indication information of the second bit corresponding to the at least two bits;
an OR operation is performed on the at least two bits to obtain indication information of one second bit corresponding to the at least two bits;
an XOR operation is performed on the at least two bits to obtain indication information of one second bit corresponding to the at least two bits.

5. The method according to claim 2, wherein the first value is a negative acknowledgement character (NACK), and/or the second value is an acknowledgement character (ACK).

6. The method according to claim 1, further comprising:
receiving scheduling signaling transmitted by a control node, wherein the scheduling signaling is used to indicate a sidelink resource; and
performing sidelink transmission on the sidelink resource.

7. A sidelink information transmission method, performed by a control node and comprising:
receiving, on a target resource, target notification information transmitted by a terminal, wherein the target notification information is target notification information mapped from sidelink information; and the sidelink information comprises at least one of sidelink hybrid automatic repeat request acknowledgement (sidelink HARQ-ACK) information corresponding to one or more sidelink transmissions, a sidelink scheduling request, and channel state information, wherein the target resource is a physical uplink control channel (PUCCH) or physical uplink shared channel (PUSCH);
wherein a mode of mapping the sidelink information to the target notification information comprises: mapping N3 first bits to W second bits according to a preset mode, W is a positive integer, N3 is an integer greater than 1, and N3 is greater than W; and
the first bits are bits in the sidelink information, the second bits are bits in the target notification information.

8. The method according to claim 7, wherein the preset mode comprises:
in a case that at least two bits comprise at least one bit indicating a first value, one second bit corresponding to the at least two bits indicates the first value, wherein the at least two bits are bits of the N3 first bits;
in a case that the at least two bits all indicate a second value, one second bit corresponding to the at least two bits indicates the second value;
or,
in a case that the at least two bits comprise at least one bit indicating a second value, one second bit corresponding to the at least two bits indicates the second value;
in a case that the at least two bits all indicate a first value, one second bit corresponding to the at least two bits indicates the first value.

9. The method according to claim 8, wherein the preset mode comprises: a modulo P operation is performed on a sum of the N3 first bits to obtain indication information of the W second bits, wherein P is an integer greater than 1.

10. The method according to claim 8, wherein the preset mode comprises:
an AND operation is performed on the at least two bits to obtain indication information of the second bit corresponding to the at least two bits;
an OR operation is performed on the at least two bits to obtain indication information of one second bit corresponding to the at least two bits;
an XOR operation is performed on the at least two bits to obtain indication information of one second bit corresponding to the at least two bits.

11. The method according to claim 8, wherein the first value is a negative acknowledgement character (NACK), and/or the second value is an acknowledgement character (ACK).

12. The method according to claim 7, further comprising:
transmitting scheduling signaling to the terminal, wherein the scheduling signaling is used to indicate a sidelink resource.

13. A terminal, comprising a memory, a processor, and a program stored in the memory and capable of running on the processor, wherein when the program is executed by the processor, the steps of the sidelink information transmission method are implemented, wherein the method comprises:
mapping sidelink information to target notification information, wherein the sidelink information comprises at least one of sidelink hybrid automatic repeat request acknowledgement (sidelink HARQ-ACK) information corresponding to one or more sidelink transmissions, a sidelink scheduling request, and channel state information; and
transmitting the target notification information on a target resource, wherein the target resource is a physical uplink control channel (PUCCH) or physical uplink shared channel (PUSCH);
wherein a mode of mapping the sidelink information to the target notification information comprises: mapping N3 first bits to W second bits according to a preset mode, W is a positive integer, N3 is an integer greater than 1, and N3 is greater than W and
the first bits are bits in the sidelink information, the second bits are bits in the target notification information.

14. The terminal according to claim 13, wherein the preset mode comprises at least one of the following:
in a case that at least two bits comprise at least one bit indicating a first value, one second bit corresponding to the at least two bits indicates the first value, wherein the at least two bits are bits of the N3 first bits;
in a case that the at least two bits all indicate a second value, one second bit corresponding to the at least two bits indicates the second value;
or,
in a case that the at least two bits comprise at least one bit indicating a second value, one second bit corresponding to the at least two bits indicates the second value;
in a case that the at least two bits all indicate a first value, one second bit corresponding to the at least two bits indicates the first value.

15. The terminal according to claim 14, wherein a modulo P operation is performed on a sum of the N3 first bits to obtain indication information of the W second bits, wherein P is an integer greater than 1.

16. The terminal according to claim 14, wherein an AND operation is performed on the at least two bits to obtain indication information of the second bit corresponding to the at least two bits;
an OR operation is performed on the at least two bits to obtain indication information of one second bit corresponding to the at least two bits;

an XOR operation is performed on the at least two bits to obtain indication information of one second bit corresponding to the at least two bits.

17. The terminal according to claim 14, wherein the first value is a negative acknowledgement character (NACK), and/or the second value is an acknowledgement character (ACK).

18. A control node, comprising a memory, a processor, and a program stored in the memory and capable of running on the processor, wherein when the program is executed by the processor, the steps of the sidelink information transmission method are implemented, wherein the method comprises:

receiving, on a target resource, target notification information transmitted by a terminal, wherein the target notification information is target notification information mapped from sidelink information; and the sidelink information comprises at least one of sidelink hybrid automatic repeat request acknowledgement (sidelink HARQ-ACK) information corresponding to one or more sidelink transmissions, a sidelink scheduling request, and channel state information, wherein the target resource is a physical uplink control channel (PUCCH) or physical uplink shared channel (PUSCH);

wherein a mode of mapping the sidelink information to the target notification information comprises: mapping N3 first bits to W second bits according to a preset mode, W is a positive integer, N3 is an integer greater than 1, and N3 is greater than W; and the first bits are bits in the sidelink information, the second bits are bits in the target notification information.

19. The control node according to claim 18, wherein the preset mode comprises at least one of the following:

in a case that at least two bits comprise at least one bit indicating a first value, one second bit corresponding to the at least two bits indicates the first value, wherein the at least two bits are bits of the N3 first bits;

in a case that the at least two bits all indicate a second value, one second bit corresponding to the at least two bits indicates the second value;

or, in a case that the at least two bits comprise at least one bit indicating a second value, one second bit corresponding to the at least two bits indicates the second value;

in a case that the at least two bits all indicate a first value, one second bit corresponding to the at least two bits indicates the first value.

20. The control node according to claim 19, wherein the first value is a negative acknowledgement character (NACK), and/or the second value is an acknowledgement character (ACK).

* * * * *